3,172,877
COPOLYMERIZATION OF VINYL CHLORIDE AND VINYL ACETATE

Leon Fishbein, New City, N.Y., and Bernard F. Crowe, Maplewood, N.J., assignors to Air Reduction Company, Incorporated, New York, N.Y., a corporation of New York
No Drawing. Filed Oct. 6, 1961, Ser. No. 143,298
13 Claims. (Cl. 260—87.1)

This invention relates to polymerization processes and more particularly to processes for copolymerizing vinyl chloride and vinyl acetate.

Polyvinyl chloride and copolymers of vinyl chloride and vinyl acetate are commonly made by suspension polymerization processes. It is relatively easy to make white, free-flowing granular polyvinyl chloride of good quality using any one of a number of known suspending agents in a suspension polymerization process. Gelatin, for example, can be used quite advantageously to make good quality polyvinyl chloride, and has the advantage of low cost as compared to other suspending agents. Copolymers of vinyl chloride and vinyl acetate, on the other hand, are much more difficult to prepare. Attempts to prepare such copolymers in suspension polymerization processes using the same suspending agents and reaction conditions as those used in vinyl chloride homopolymerization frequently result in the production of copolymer which is sticky and off-white in color.

It is an object of the present invention to provide a suspension polymerization process for producing white, free-flowing granular copolymers of vinyl chloride and vinyl acetate.

Another object of this invention is to provide a suspending agent which is suitable for use in copolymerizing vinyl chloride and vinyl acetate.

According to the present invention it has been found that vinyl chloride and vinyl acetate can be copolymerized in aqueous suspension to give white granular free-flowing copolymers of high quality, using as the suspending agent from 0.15 to 0.4%, based on the total weight of monomers, of polyvinyl alcohol which is from 80 to 95% hydrolyzed and which has a viscosity of about 25 to about 100 centipoises in a 4% aqueous solution at 20° C. The suspension is buffered with an alkaline buffer to an initial pH of about 7.5 to about 8.0.

This invention is particularly applicable to the preparation of vinyl chloride-vinyl acetate copolymers from comonomer mixtures of vinyl chloride and vinyl acetate containing from 75 to 95% by weight of vinyl chloride and from 5 to 25% by weight of vinyl acetate.

The amount of polyvinyl alcohol used as the suspending agent in the process of this invention is important. Effective suspension of the monomers in the aqueous medium is not achieved when the amount of polyvinyl alcohol is less than about 0.15%. Best results are obtained when the concentration of polyvinyl alcohol is about 0.20 to about 0.25% by weight. When the polyvinyl alcohol concentration is within this range, a white, free-flowing granular copolymer in which most of the particles are in the range of 100 to 200 mesh, with very few fines, is obtained. An increase in the concentration of polyvinyl alcohol generally results in a copolymer of smaller average particle size with a higher percentage of fines. The use of polyvinyl alcohol in concentrations over about 0.4% results in a vinyl chloride-vinyl acetate copolymer of very small average particle size with an undesirably large proportion of fines.

The viscosity of the polyvinyl alcohol suspending agent is also critical. The polyvinyl alcohol should have a viscosity of about 25 to about 100 centipoises as measured in a 4% aqueous solution at 20° C. This viscosity range encompasses polyvinyl alcohols sold commercially under the designations "medium viscosity" and "high viscosity." The use of polyvinyl alcohol having a viscosity of less than about 25 centipoises does not properly suspend the monomer mixture in the aqueous medium.

The percentage of hydrolysis of the polyvinyl alcohol is likewise of critical importance. Good results are obtained when the polyvinyl alcohol is about 80 to about 95% hydrolyzed. The percentage hydrolysis refers to the percentage of acetate radicals which have been hydrolyzed to hydroxyl radicals. Polyvinyl alcohol hydrolyzed to a greater extent than 95% is a much poorer suspending agent than polyvinyl alcohol which is 80 to 95% hydrolyzed. An excessively large amount of polyvinyl alcohol having greater than 95% hydrolysis is required to keep the monomer in suspension, and the copolymer becomes agglomerated.

In addition to the vinyl chloride and vinyl acetate monomers, water, and polyvinyl alcohol already mentioned, the polymerization mixture contains a chain transfer agent, an alkaline buffer, and a catalyst.

The chain transfer agent is a chlorinated aliphatic hydrocarbon containing from 1 to 3 carbon atoms, in which either part or all of the hydrogen atoms are replaced by chlorine atoms. Trichloroethylene has been found to be particularly useful as the chain transfer agent. Other chain transfer agents include carbon tetrachloride, methylene chloride, perchloroethylene, 1,1,1-trichloroethane, 1,3-dichloropropane, and the like. The amount of chain transfer agent can be varied widely. Amounts of chain transfer agent ranging from about 0.5 to about 3% based on the total weight of monomers can be used.

Any alkaline material which is compatible with polyvinyl alcohol can be used as the buffer. The amount of buffer is sufficient to adjust the pH of the suspension at the outset of polymerization to a value in the range of 7.5 to 8.0. Sodium bicarbonate is a preferred buffer because of its compatibility with polyvinyl alcohol and its low cost. The amount of sodium bicarbonate used as a buffer is generally about 0.1 to 0.5% by weight, based on monomers, although larger amounts do not have a deleterious effect. Other buffers such as disodium phosphate, sodium acetate, and the like can also be used.

Any free radical initator catalyst commonly used for polymerization of vinyl compounds in an aqueous suspension can be used in the present invention. The most important catalysts are the organic peroxides and alpha, alpha'-azobis(isobutyronitrile). Lauroyl peroxide is the preferred catalyst, but other peroxides such as benzoyl peroxide, tert-butyl hydroperoxide, cumyl peroxide, capryloyl peroxide, and the like may be used instead. The catalyst is used in an amount ranging from 0.1 to about 0.5% of the weight of monomers. Excellent results are obtained when the catalyst concentration is about 0.2 to about 0.3%. The catalyst concentration is preferably varied somewhat as the amount of chain transfer agent is varied, the lower catalyst concentrations being used with the lower chain transfer agents.

Polymerization according to this invention is carried out at temperatures and pressures which are conventional in the suspension polymerization art. The temperature is generally in the range of about 50 to about 70° C., particularly effective results being obtained at about 55 to about 65° C. The initial pressure may range anywhere from about 80 to about 150 p.s.i.g., and pressures of about 100 to about 130 p.s.i.g. have been found to be particularly suitable. The pressure remains approximately at the initial level during the first portion of polymerization and then gradually falls as the reaction proceeds.

Polymerization times of about 6 to 18 hours, and especially about 9 to 12 hours, may be used. The temperature and time are preferably so correlated that copolymerization of vinyl chloride and vinyl acetate is not carried to completion. It is desirable to stop polymerization when the pressure has fallen to about 40 to 70 p.s.i.g. Vinyl chloride polymerizes more readily than vinyl acetate, so that the percentage of vinyl acetate in the unreacted monomers increases as polymerization proceeds. If polymerization is carried substantially to completion, the polymer formed toward the end of the polymerization period is either polyvinyl acetate or a copolymer containing a substantial portion of vinyl acetate. Polyvinyl acetate and copolymers containing a substantial portion of vinyl acetate tend to be gummy, and this impairs the flowability of the final product.

This invention will now be described in detail with reference to specific embodiments thereof.

*Example 1*

A suspension having the following composition was prepared:

| | Parts by weight |
|---|---|
| Vinyl chloride | 83.1 |
| Vinyl acetate | 16.9 |
| Trichloroethylene | 2.42 |
| Polyvinyl alcohol | 0.22 |
| Sodium bicarbonate | 0.22 |
| Lauroyl peroxide | 0.20 |
| Water | 192 |

The polyvinyl alcohol used in this example consisted of equal parts by weight of "Elvanol 50–42" and "Gelvatol 20–90." Both "Elvanol 50–42" and "Gelvatol 20–90" are medium viscosity polyvinyl alcohols, having viscosities of 35 to 45 centipoises in a 4% aqueous solution at 20° C., and a percentage hydrolysis of 86 to 89%.

The temperature of the suspension was maintained at 61° C. throughout polymerization, and 115 p.s.i.g. which was carried out over a period of about 10 hours. The pressure was 115 p.s.i.g. for about the first five hours and then was gradually decreased to approximately 40 p.s.i.g. At the end of the polymerization period, the pressure was released and the temperature allowed to cool. The copolymer was recovered, washed and dried. A finely divided granular copolymer in which nearly all of the particles were finer than 50 mesh and 57% finer than 200 mesh, and having a composition of 85 parts of vinyl chloride and 15 parts of vinyl acetate, was obtained.

*Example 2*

The recipe and procedure of Example 1 were used except that the polyvinyl alcohol consisted of 75% of "Elvanol 50–42" and 25% of "Gelvatol 20–90." The copolymer was more finely divided than that obtained in Example 1, 94% being 200 mesh or finer. This copolymer was granular, white and free-flowing, and contained 85 parts of vinyl chloride and 15 parts of vinyl acetate.

*Example 3*

A suspension having the following composition was prepared:

| | Parts by weight |
|---|---|
| Vinyl chloride | 83.1 |
| Vinyl acetate | 16.9 |
| Trichloroethylene | 2.42 |
| Polyvinyl alcohol | 0.18 |
| Sodium bicarbonate | 0.22 |
| Lauroyl peroxide | 0.20 |
| Water | 192 |

The polyvinyl alcohol used in this recipe consisted of equal parts of "Elvanol 50–42" and "Gelvatol 20–90."

Polymerization was carried out under the same conditions as in Example 1. The copolymer was coarser than that obtained in Example 1, and had the same composition.

*Example 4*

A suspension having the following composition was prepared:

| | Parts by weight |
|---|---|
| Vinyl chloride | 83.1 |
| Vinyl acetate | 16.9 |
| Trichloroethylene | 2.42 |
| Polyvinyl alcohol | 0.34 |
| Sodium bicarbonate | 0.22 |
| Lauroyl peroxide | 0.20 |
| Water | 192 |

The polyvinyl alcohol used in this recipe consisted of equal parts of "Elvanol 50–42" and "Gelvatol 20–90."

Polymerization was carried out under the same conditions as in Example 1. The copolymer was finer than that obtained in Example 1, and had the same composition.

*Example 5*

A suspension having the following composition was prepared:

| | Parts by weight |
|---|---|
| Vinyl chloride | 84 |
| Vinyl acetate | 16 |
| Trichloroethylene | 1.28 |
| Polyvinyl alcohol | 0.32 |
| Sodium bicarbonate | 0.49 |
| Lauroyl peroxide | 0.18 |
| Water | 195 |

The polyvinyl alcohol in this recipe was "Vinol 523," a medium viscosity (25 to 30 centipoises in a 4% aqueous solution at 20° C.) polyvinyl alcohol which is 86 to 89% hydrolyzed.

Polymerization was carried out under the same conditions as described in Example 1. The product after washing and drying was a white, granular free-flowing copolymer containing 86 parts of vinyl chloride and 14 parts of vinyl acetate.

*Example 6*

A suspension having the following composition was prepared:

| | Parts by weight |
|---|---|
| Vinyl chloride | 83.1 |
| Vinyl acetate | 16.9 |
| Trichloroethylene | 1.82 |
| Polyvinyl alcohol | 0.22 |
| Sodium bicarbonate | 0.22 |
| Lauroyl peroxide | 0.12 |
| Water | 192 |

The polyvinyl alcohol in this example consisted of equal parts by weight of "Elvanol 50–42" and "Gelvatol 20–90."

Polymerization was carried out under the same conditions as in Example 1. A copolymer containing 85 parts of vinyl chloride and 15 parts of vinyl acetate was obtained.

*Example 7*

A suspension having the following composition was prepared:

| | Parts by weight |
|---|---|
| Vinyl chloride | 85.5 |
| Vinyl acetate | 14.5 |
| Trichloroethylene | 0.64 |
| Polyvinyl alcohol | 0.23 |
| Sodium bicarbonate | 0.23 |
| Lauroyl peroxide | 0.13 |
| Water | 197 |

The polyvinyl alcohol in this recipe consisted of equal parts of "Elvanol 50–42" and "Gelvatol 20–90."

Polymerization was carried out under the same conditions as in Example 1. A copolymer containing 93% by weight of vinyl chloride and 7% by weight of vinyl acetate was obtained.

Example 8

A suspension having the following composition was prepared:

| | Parts by weight |
|---|---|
| Vinyl chloride | 83.1 |
| Vinyl acetate | 16.9 |
| Trichloroehtylene | 1.22 |
| Polyvinyl alcohol | 0.22 |
| Sodium bicarbonate | 0.22 |
| Lauroyl peroxide | 0.16 |
| Water | 192 |

The polyvinyl alcohol in this recipe consisted of equal parts of "Elvanol 50–42" and "Gelvatol 20–90."

Polymerization was carried out under the same conditions as in Example 1. A copolymer containing 77.5 parts of vinyl chloride and 22.5 parts of vinyl acetate was obtained.

Example 9

A suspension having the following composition was prepared:

| | Parts by weight |
|---|---|
| Vinyl chloride | 83.1 |
| Vinyl acetate | 16.9 |
| Carbon tetrachloride | 2.42 |
| Polyvinyl alcohol | 0.22 |
| Sodium bicarbonate | 0.22 |
| Lauroyl peroxide | 0.20 |
| Water | 192 |

The polyvinyl alcohol in this recipe consisted of equal parts of "Elvanol 50–42" aud "Gelvatol 20–90."

Polymerization was carried out under the same conditions as in Example 1. A copolymer containing 84% of vinyl chloride and 16% of vinyl acetate was obtained.

Example 10

A suspension having the following composition was prepared:

| | Parts by weight |
|---|---|
| Vinyl chloride | 83 |
| Vinyl acetate | 17 |
| Trichloroethylene | 2.50 |
| Polyvinyl alcohol | 0.23 |
| Sodium bicarbonate | 0.50 |
| Capryloyl peroxide | 0.19 |
| Water | 193 |

The polyvinyl alcohol was "PA–40", a medium viscosity (40 centipoises in a 4% aqueous solution at 20% C.) polyvinyl alcohol which is 88% hydrolyzed.

Polymerization was carried out under the same conditions as in Example 1, except that the time was 8 hours. A copolymer containing 84.5% of vinyl chloride and 15.5% of vinyl acetate was obtained.

Example 11

A suspension having the following composition was prepared:

| | Parts by weight |
|---|---|
| Vinyl chloride | 83 |
| Vinyl acetate | 17 |
| Trichloroethylene | 2.53 |
| Polyvinyl alcohol | 0.23 |
| Sodium bicarbonate | 0.50 |
| α,α'-azobis(isobutyronitrile) | 0.24 |
| Water | 192 |

The polyvinyl alcohol in this recipe consisted of equal parts of "Elvanol 50–42" and 'Gelvatol 20–90."

Polymerization was carried out under the same conditions as in Example 1. A copolymer containing 85% by weight of vinyl chloride and 15% by weight of vinyl acetate was obtained.

While this invention has been described in detail with reference to specific embodiments thereof it is understood that the scope of this invention shall be limited only by the scope of the claims.

We claim:

1. A process for preparing white, granular, free flowing copolymers of vinyl chloride and vinyl acetate by aqueous suspension polymerization, which comprises polymerizing a vinyl chloride-vinyl acetate monomer mixture in an aqueous suspension polymerization system, said monomer mixture containing from about 75% to 95% by weight of vinyl chloride and from about 5% to 25% by weight of vinyl acetate, said system containing from about 0.15% to about 0.4% by weight of said monomer mixture of a polyvinyl alcohol being from 80% to 95% hydrolyzed and having a viscosity of about 25 centipoises to about 100 centipoises in a 4% aqueous solution at 20° C., said system containing from about 0.5% to about 3% by weight of said monomer mixture of a chlorinated hydrocarbon containing from 1 to 3 carbon atoms, said system containing from about 0.1% to about 0.5% by weight of said monomer mixture of a free radical initiator effective for the polymerization of vinyl compounds, said system containing an amount of alkaline buffer compatible with said polyvinyl alcohol and sufficient to adjust the initial pH of said system to about 7.5 to about 8.0, where the initial pressure of said system is from about 80 p.s.i.g. to about 150 p.s.i.g. and where the temperature of said system during said polymerization is within the range from about 50° C. to about 70° C., and terminating said polymerization before all of said vinyl chloride and all of said vinyl acetate have reacted.

2. A process according to claim 1, wherein said free radical initiator is lauroyl peroxide.

3. A process according to claim 2, wherein said alkaline buffer is sodium bicarbonate.

4. A process for preparing white, granular, free flowing particles of copolymers of vinyl chloride and vinyl acetate by aqueous suspension polymerization, which comprises preparing an initial aqueous suspension polymerization system containing a vinyl chloride-vinyl acetate monomer mixture, polyvinyl alcohol, a free radical initiator effective for the polymerization of vinyl compounds, and alkaline buffer compatible with said polyvinyl alcohol; the amount of said alkaline buffer being sufficient to adjust the initial pH of said system to about 7.5 to about 8.0; adjusting the initial temperature and initial pressure of said system within the range from about 50° C. to about 70° C. and from about 80 p.s.i.g. to about 150 p.s.i.g.; initiating and conducting the polymerization of said monomer mixture in the polymerization system at a temperature within the range of from about 50° C. to about 70° C.; continuing said polymerization until said initial pressure has decreased to a final value within the range from about 40 p.s.i.g. to about 70 p.s.i.g., whereby when said polymerization is terminated the polymerization system contains unreacted vinyl chloride and unreacted vinyl acetate and whereby the copolymer product produced does not contain copolymers containing a substantial portion of vinyl acetate; recovering said copolymer product comprising white, granular, free flowing particles of vinyl chloride-vinyl acetate copolymers; and where said polyvinyl alcohol in said initial system is from 80% to 95% hydrolyzed and has a viscosity of about 25 centipoises to about 100 centipoises in a 4% aqueous solution at 20° C. and is from about 0.15% to about 0.4% by weight of said monomer mixture; and where said chlorinated hydrocarbon in said initial system contains from 1 to 3 carbon atoms and is from about 0.5% to about 3% by weight of said monomer mixture; and where said free radical initiator in said initial system is from about 0.1% to about 0.5% by weight of said monomer mixture.

5. A process according to claim 4, wherein said initial temperature and said initial pressure is within the range of from about 55° C. to about 65° C. and from about 100 p.s.i.g. to about 130 p.s.i.g.; and where said final pressure is about 40 p.s.i.g.

6. A process according to claim 5, wherein said free radical initiator is lauroyl peroxide.

7. A process according to claim 6, wherein said alkaline buffer is sodium bicarbonate.

8. A process according to claim 7 wherein the concentration of said polyvinyl alcohol is from about 0.20% to 0.25% by weight.

9. A process for preparing white, granular, free flowing particles of copolymers and vinyl chloride and vinyl acetate by aqueous suspension polymerization which comprises preparing an aqueous suspension polymerization system containing about 83.1 parts vinyl chloride, about 16.9 parts vinyl acetate, about 2.42 parts trichloroethylene, about 0.22 parts sodium bicarbonate, about 0.20 parts lauroyl peroxide, about 192 parts water, and about 0.22 parts of polyvinyl alcohol being from 86% to 89% hydrolyzed and having a viscosity of about 35 centipoises to about 45 centipoises in a 4% aqueous solution at 20° C.; adjusting the initial temperature and initial pressure of said system to about 61° C. and about 115 p.s.i.g.; initiating and conducting the polymerization of said vinyl chloride and said vinyl acetate in the polymerization system while the polymerization system temperature is about 61° C.; terminating said polymerization when said initial pressure has decreased to about 40 p.s.i.g.; and recovering product vinyl chloride-vinyl acetate copolymer particles.

10. A process for preparing white, granular, free flowing copolymers of vinyl chloride and vinyl acetate by aqueous suspension polymerization as defined in claim 1, wherein said free radical initiator is selected from the group consisting of organic peroxides and azo compounds.

11. A process for preparing white, granular, free flowing copolymers of vinyl chloride and vinyl acetate by aqueous suspension polymerization as defined in claim 4, wherein said free radical initiator is selected from the group consisting of organic peroxides and azo compounds.

12. A process for preparing white, granular, free flowing copolymers of vinyl chloride and vinyl acetate by aqueous suspension polymerization as defined in claim 1, wherein said buffer is selected from the group consisting of sodium bicarbonate, sodium acetate, and disodium phosphate.

13. A process for preparing white, granular, free flowing copolymers of vinyl chloride and vinyl acetate by aqueous suspension polymerization as defined in claim 4, wherein said buffer is selected from the group consisting of sodium bicarbonate, sodium acetate, and disodium phosphate.

References Cited in the file of this patent

UNITED STATES PATENTS

| | | |
|---|---|---|
| 2,705,226 | Bond | Mar. 29, 1955 |
| 2,752,331 | Dittman et al. | June 26, 1956 |
| 3,033,839 | Heckmaier et al. | May 8, 1962 |
| 3,049,521 | Burkholder | Aug. 14, 1962 |

OTHER REFERENCES

Thomas et al.: British Plastics (pages 522–525), December 1958.

Emmer et al.: Industrial & Engineering Chemistry, vol. 46, No. 4, pages 673–75, April 1954.

Schildknecht: Vinyl and Related Polymers (pages 15, 26, 106, 220, 330, and 504), Wiley, N.Y., 1952.

UNITED STATES PATENT OFFICE
CERTIFICATE OF CORRECTION

Patent No. 3,172,877                          March 9, 1965

Leon Fishbein et al.

It is hereby certified that error appears in the above numbered patent requiring correction and that the said Letters Patent should read as corrected below.

Column 5, line 49, for "20% C." read -- 20° C. --.

Signed and sealed this 21st day of September 1965.

(SEAL)
Attest:

ERNEST W. SWIDER                        EDWARD J. BRENNER
Attesting Officer                        Commissioner of Patents